Aug. 14, 1945.  E. KOPPL ET AL  2,382,725
ROTARY UNDERREAMER
Filed Dec. 9, 1942   6 Sheets-Sheet 1
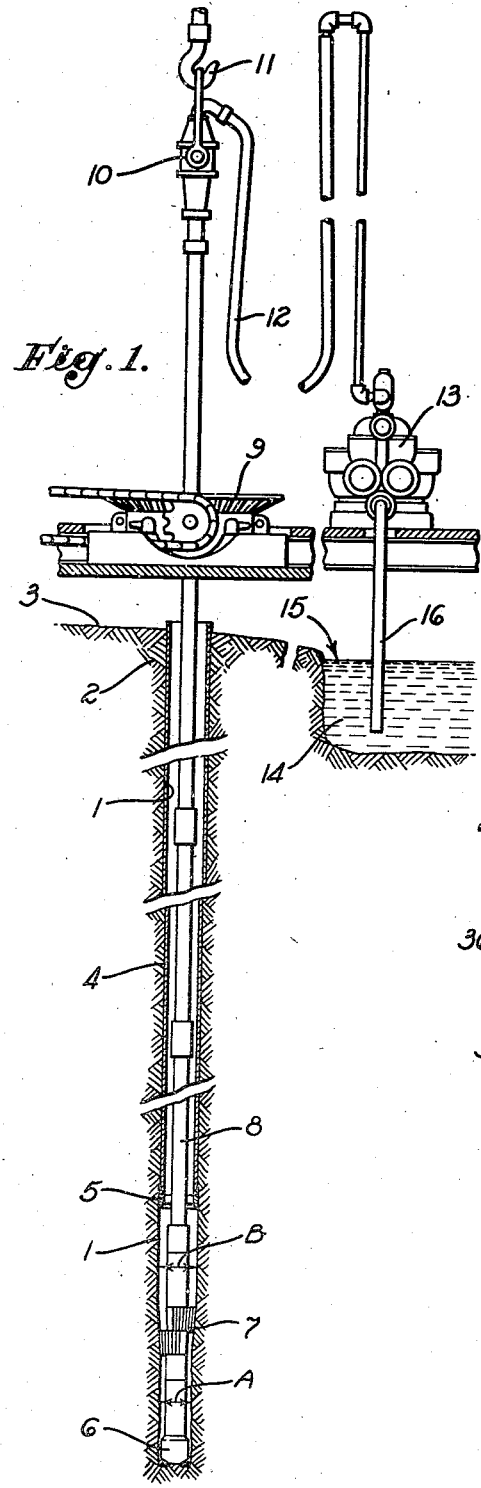
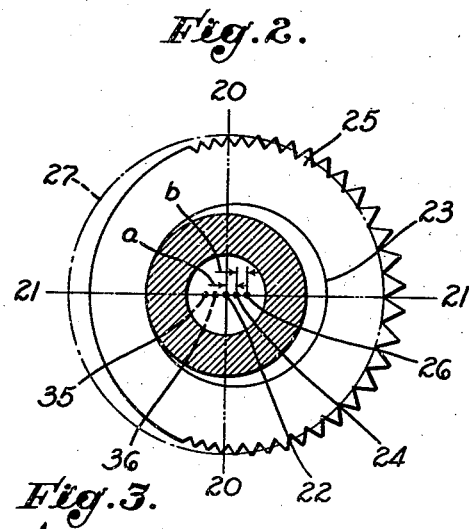
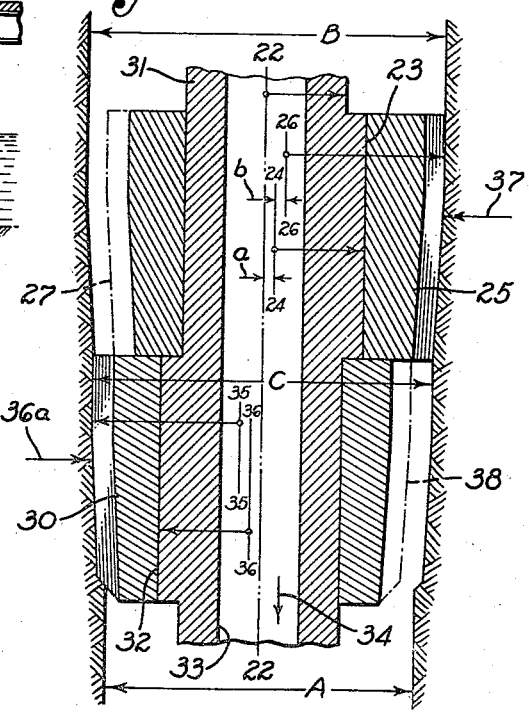
INVENTORS
ERNEST KOPPL
FORD W. HARRIS
BY
HARRIS, KIECH, FOSTER & HARRIS
FOR THE FIRM
ATTORNEYS.

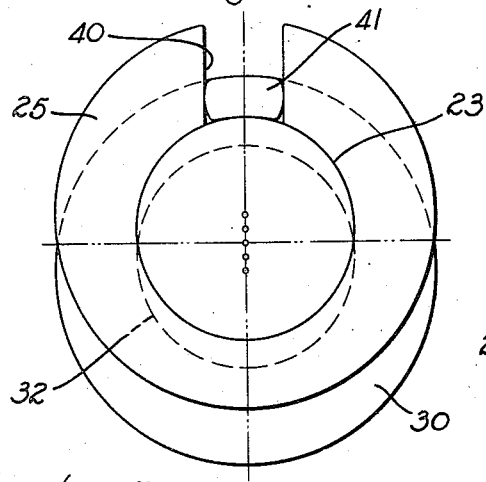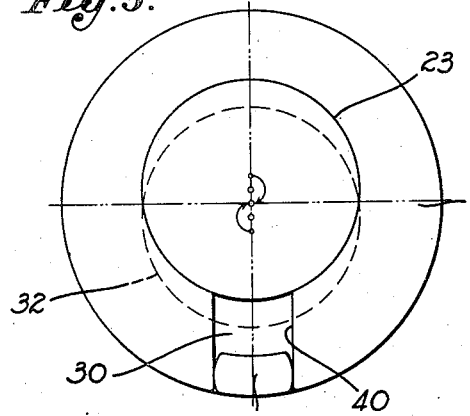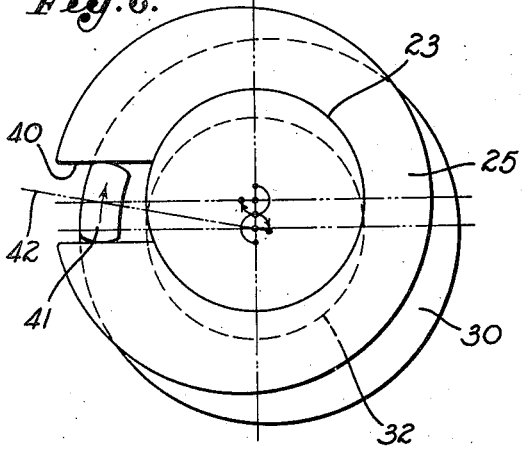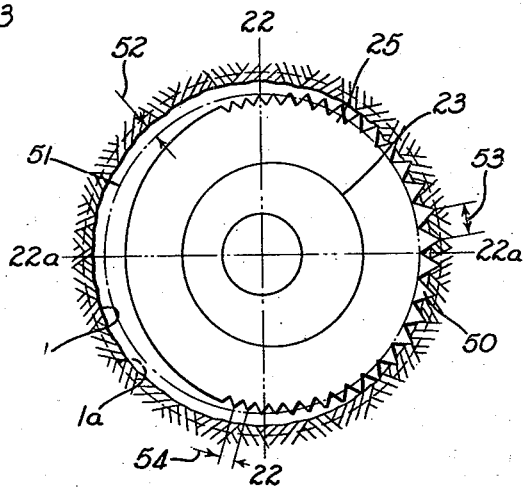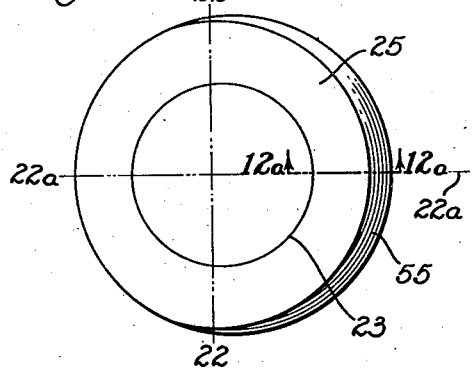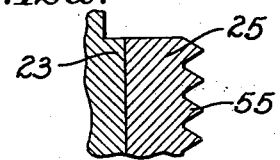

Aug. 14, 1945.  E. KOPPL ET AL  2,382,725
ROTARY UNDERREAMER
Filed Dec. 9, 1942  6 Sheets-Sheet 4

INVENTORS
ERNEST KOPPL
FORD W. HARRIS
BY HARRIS, KIECH, FOSTER & HARRIS
FOR THE FIRM
ATTORNEYS.

Aug. 14, 1945.  E. KOPPL ET AL  2,382,725
ROTARY UNDERREAMER
Filed Dec. 9, 1942   6 Sheets-Sheet 6

INVENTORS
ERNEST KOPPL
FORD W. HARRIS
BY
HARRIS, KIECH, FOSTER & HARRIS
FOR THE FIRM
ATTORNEYS.

Patented Aug. 14, 1945

2,382,725

UNITED STATES PATENT OFFICE 2,382,725

ROTARY UNDERREAMER

Ernest Koppl, Huntington Beach, and Ford W. Harris, Los Angeles, Calif., assignors to Patco, Inc., Los Angeles, Calif., a corporation of California Application December 9, 1942, Serial No. 468,442

18 Claims. (Cl. 255—74)

Our invention relates to the art of drilling wells and is especially useful in drilling deep oil wells. Such wells may be drilled by either the "standard" or the "rotary" system. In the standard system the drilling bit is oscillated up and down in the well, cutting by percussion, while in the rotary system the bit is rotated by a drill pipe, the bit being carried on the lower end of the drill pipe. Our invention is used in the rotary system.

In drilling wells by the rotary system, it is not only necessary to drill the well to such a diameter that a casing may be inserted therein, but it is also necessary at times to enlarge the hole previously made or to "ream" it. When such a hole is so enlarged to a diameter larger than the inside of the casing, which is then in place in the well, by means readily passing through the casing, the hole is said to be "underreamed," and the tool used is called an "underreamer."

It is an object of our invention to provide a new and useful form of underreamer, that is, a reamer that will readily pass through a casing with its cutters in a retracted position, but in which the cutters are moved to an expanded position after the reamer leaves the bottom of the casing and thereafter reams a hole of larger diameter than the inside diameter of the casing.

In most underreamers the cutters are held in their retracted position by contact with the casing and expand as soon as the reamer leaves the casing. It is an object of our invention to provide positive locking means for the cutters which holds the cutters in their retracted position before the reamer enters the casing and after it leaves the casing.

It is a further object of the invention to provide means for releasing the locking mechanism when the mud pump is started, that is, when drilling mud is circulated through the reamer, and to throw the locking means into engaging position whenever the mud pump is stopped and circulation ceases.

It is a further object of the invention to so connect or gear two or more cutters together that all the cutters are in their retracted position at the same time and that, if one cutter is locked in this retracted position, all the cutters are so locked.

Further objects and advantages of the invention will be explained in detail hereinafter.

Referring to the drawings, which are for illustrative purposes only,

Fig. 1 is an elevational view of a well being drilled by the rotary system.

Fig. 2 is a section through a cutter on a horizontal plane illustrating how an eccentric Koppl cutter turning on an eccentric cam moves from a contracted to an expanded position.

Fig. 3 is a section on a vertical plane showing how two eccentric cutters of the Koppl type may be mounted on a spindle.

Figs. 4, 5, and 6 are views on a horizontal plane showing how Koppl cutters may be interlocked to insure joint rotation thereof.

Figure 7:
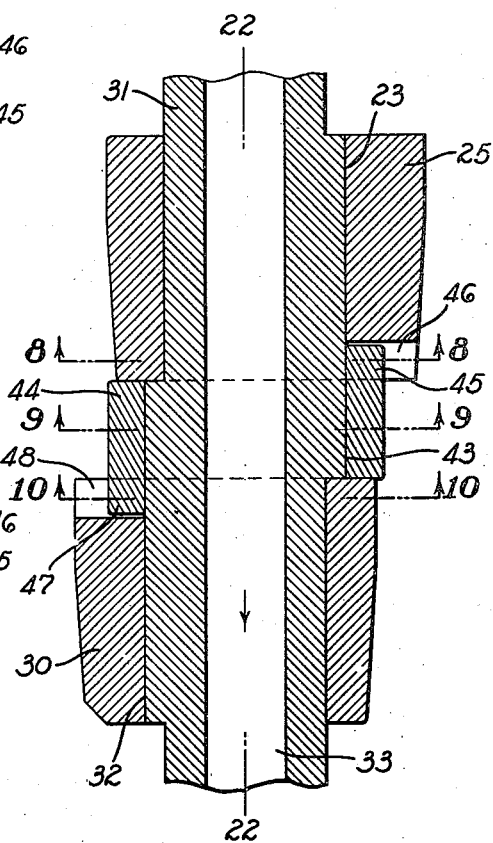

Fig. 7 is a section on a vertical plane showing how joint rotation of two Koppl cutters may be insured by use of an intermediate ring.

Figure 8:
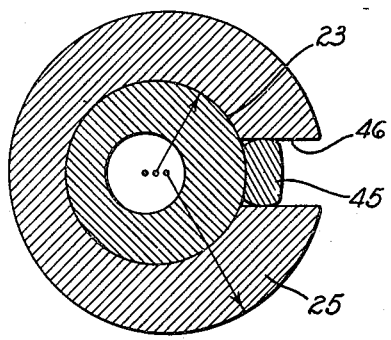

Fig. 8 is a section on a horizontal plane defined by the line 8—8 of Fig. 7.

Figure 9:
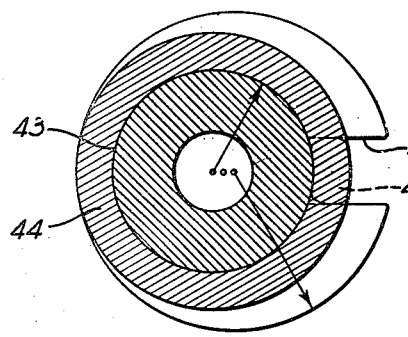

Fig. 9 is a section on a horizontal plane defined by the line 9—9 of Fig. 7.

Figure 10:
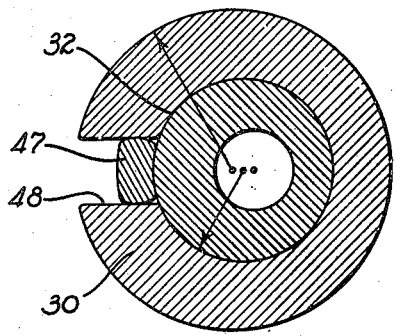

Fig. 10 is a section on a horizontal plane defined by the line 10—10 of Fig. 7.

Fig. 11 is a section on a horizontal plane to illustrate how axial teeth may be provided on a Koppl cutter.

Fig. 12 is a plan view of a Koppl cutter having circumferential teeth.

Fig. 12a is a fragmentary section taken on the line 12a—12a of Fig. 12.

Figure 13:
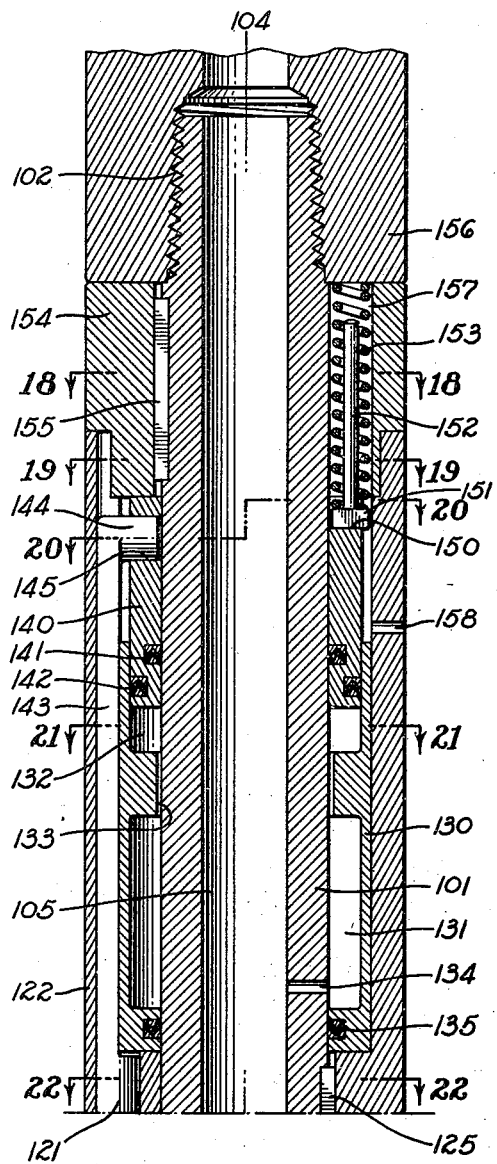
Figure 13A:
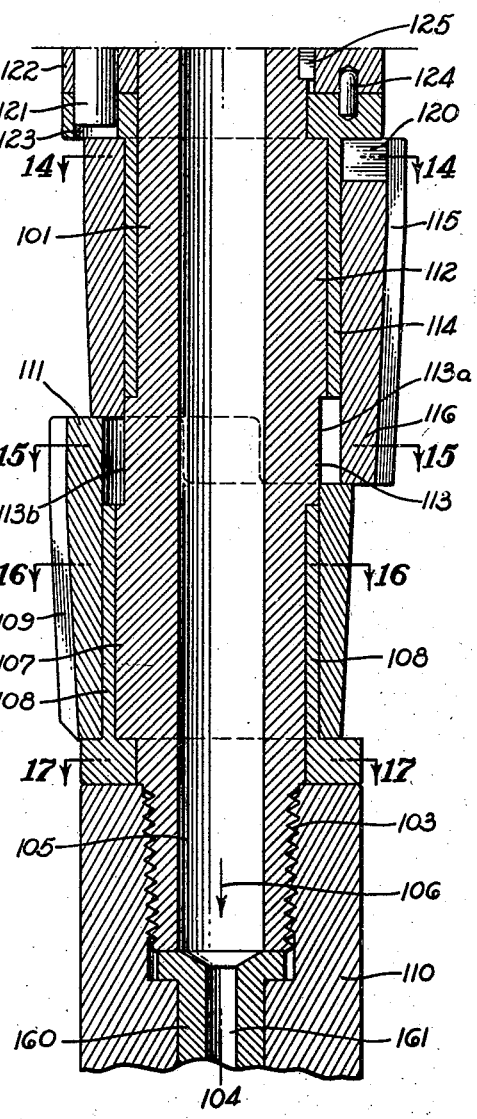

Figs. 13 and 13a are sections on a central vertical plane of a preferred form of underreamer embodying our invention.

Figure 14:
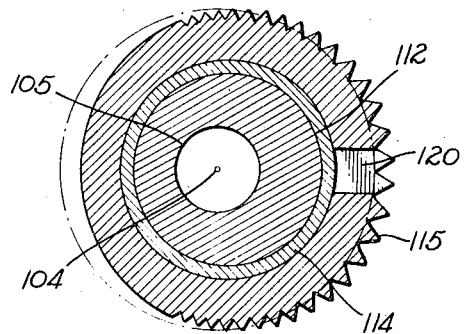

Fig. 14 is a horizontal section taken as indicated by the line 14—14 of Fig. 13a.

Figure 15:
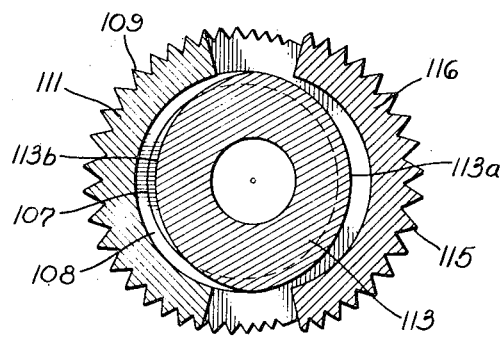

Fig. 15 is a horizontal section taken as indicated by the line 15—15 of Fig. 13 or Fig. 13a, the cutters being shown in their expanded position, as shown in Fig. 13a.

Figure 15A:
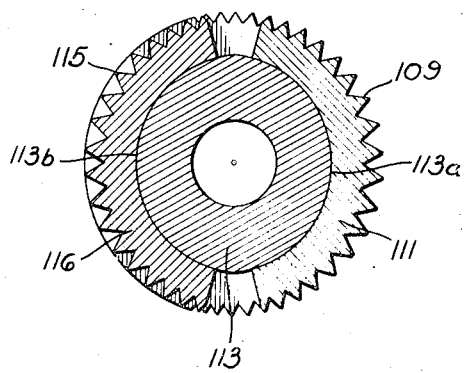

Fig. 15a is a section similar to Fig. 15 but showing the cutters in their contracted position.

Figure 16:
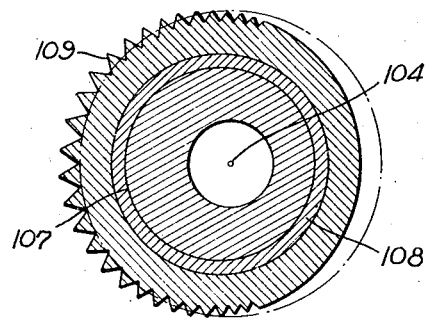

Fig. 16 is a horizontal section on a plane indicated by the line 16—16 of Fig. 13a.

Figure 17:
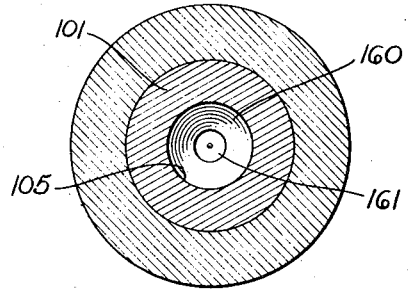

Fig. 17 is a horizontal section on a plane indicated by the line 17—17 of Fig. 13a.

Figure 18:
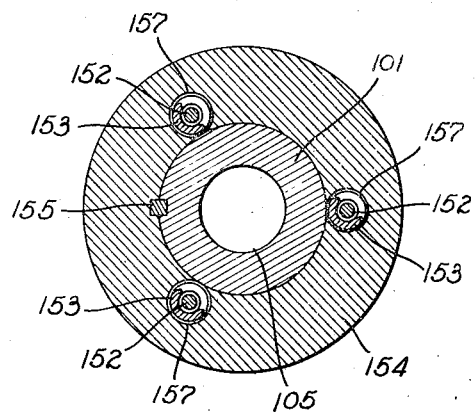

Fig. 18 is a horizontal section on a plane indicated by the line 18—18 of Fig. 13.

Figure 19:
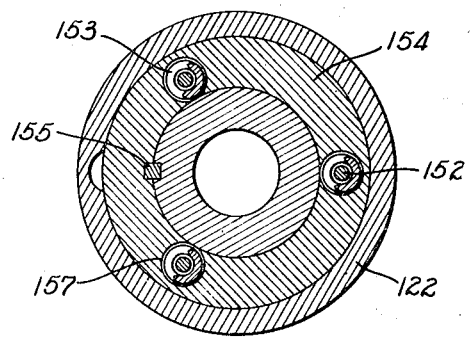

Fig. 19 is a horizontal section on a plane indicated by the line 19—19 of Fig. 13.

Figure 20:
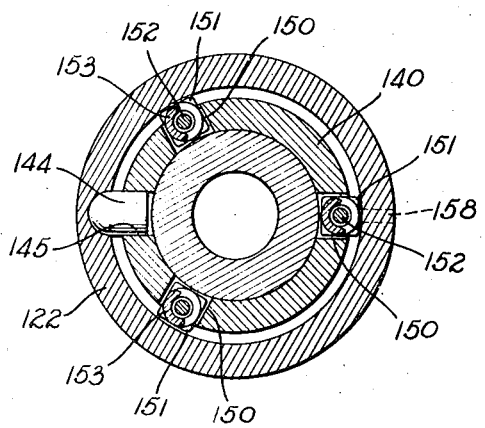

Fig. 20 is a horizontal section on a plane indicated by the line 20—20 of Fig. 13.

Figure 21:
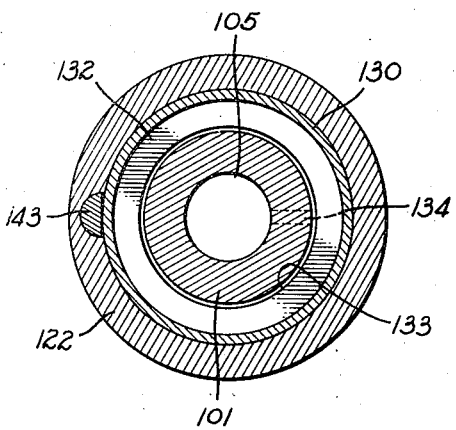

Fig. 21 is a horizontal section on a plane indicated by the line 21—21 of Fig. 13.

Figure 22:
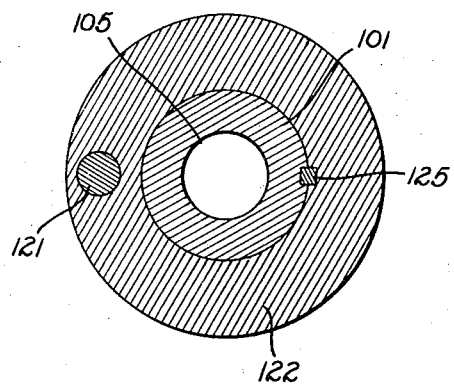

Fig. 22 is a horizontal section on a plane indicated by the line 22—22 of Fig. 13.

The figures may be described in groups as follows: Fig. 1 shows how any underreamer may be used illustrating how such reamers are used in an oil well. All the details are, of course, not shown.

Figs. 2 and 3 do not illustrate any invention claimed herein, being merely inserted to illustrate to the man skilled in the art the principles upon which a Koppl type reamer must be constructed. Figs. 4, 5, and 6 show one embodiment of our invention illustrating how the basic Koppl reamer shown in Fig. 3 may be modified to lock the cutters together by a projection on one and a recess in the other.

Figs. 7, 8, 9, and 10 show another embodiment of our invention using an intermediate ring.

Fig. 11 illustrates how cutters used in our invention may be provided with axial teeth, and Figs. 12 and 12a show how these cutters may be provided with circumferential teeth.

Figs. 13 to 22, inclusive, show the preferred form of our invention using the same general method of interlocking that is used in Figs. 4, 5, and 6.

Referring to Fig. 1, I is a well or, more properly, a well bore which extends downwardly into the ground 2 from the surface 3 thereof. Situated inside the well I and usually cemented to the wall of the well is a casing 4 having a casing shoe 5 at the lower end thereof. The well is drilled to a diameter A by a bit 6 and reamed to a diameter B by an underreamer 7. The bit 6 and underreamer 7 are secured to a drill pipe 8 which extends upwardly above the surface 3 of the ground into a derrick (not shown). A rotary table 9 driven by a motor (not shown) grips the drill pipe 8 and rotates it. The upper end of the drill pipe 8 is secured in a swivel 10, which is supported on a hook 11 of the hoisting gear (not shown) of the derrick. The drill pipe may be raised and withdrawn from the well I by means of this hoisting gear. A flexible hose 12 connects the swivel 10 with a pump 13. The pump draws mud-laden fluid 14 from a sump 15 through a pipe 16.

In the "rotary" method of drilling as now usually practiced, the underreamer 7 is not used, and the bit 6 drills a hole of the diameter A downwardly from the shoe 5. This diameter A is usually somewhat smaller than the inside diameter of the casing 4 and is necessarily not materially larger than this inside diameter, as it is drilled by the bit 6 which must be inserted in and removed from the well I through the casing 4.

The mud-laden fluid 14, which is commonly called "drilling mud," is drawn up through the pipe 16 by the pump 13 and forced through the flexible hose 12 to the swivel 10. The mud 14 passes downwardly through the drill pipe 8 to the bit 6, passes through openings in the bit 6 to the space around the bit 6 in the well I, passes upwardly inside the well but outside the drill pipe, and overflows into the sump 15. This is the usual method of drilling an oil well, and all the apparatus shown in Fig. 1 except the underreamer 7 is old and well known in the art. The mud-laden fluid or drilling mud is usually water loaded with clay to the consistency of a thick soup, although oil or water may be used as a fluid medium with or without clay or other "heaviers."

Many forms of bit 6 may be used, and our invention may be used with any of them. It will, however, be assumed that a rock bit having rotary cutters is used. Wells are commonly drilled by the rotary system above described to a considerable depth without using the casing 4, but such casing must be set whenever the well passes through water-bearing ground and be cemented in the well bore at its lower end below the water-bearing strata to shut out the water. After the casing 4 has been set and cemented, the well may be drilled without casing below the shoe 5, as the drilling mud plasters up the wall of the well and the hydrostatic pressure of the drilling mud prevents the wall of the well from caving. If water sands or caving formations are encountered below the shoe 5, a second string of casing (not shown in Fig. 1) having an outside diameter small enough to pass through the casing 4 must be inserted and have its lower end cemented. Also, after the well is drilled down into the oil producing sands, it is necessary to insert additional casing, the lower end of which is perforated with holes or slots to let the oil into the well. In some wells it is necessary to use several concentric strings of casing, and, as each string is inserted, the effective diameter of the well is reduced and the well gradually "pinches off," becoming so small in diameter that drilling becomes difficult.

Theoretically, a bit 6 which passes through the casing 4 should be able to drill a hole of about the same diameter as the inside of the casing 4 so that casing that passes readily through the casing 4 should also be able to pass through the hole of diameter A below the shoe 5. In practice, the bit 6 does not drill a truly cylindrical, smooth, straight hole, and sometimes it is very hard to get additional casing into the hole below the shoe 5. It is therefore advisable to "underream" the hole below the shoe 5 to a diameter B which is substantially larger than the diameter A, and for this purpose an "underreamer" is used. Such an underreamer must be capable of contraction to pass through the casing 4 and of expansion below the shoe 5 to ream the hole to the diameter B. Such underreamers are old in the art. The usual method is to drill the hole to the diameter A with the bit 6 and then withdraw the bit 6 and substitute the underreamer 7 for the bit, the underreamer then being used to enlarge the hole from the diameter A to the diameter B. Our underreamer may be so used, and it is an object of our invention to provide an underreamer that may be used in this manner.

This method of first drilling a hole and then, as a separate operation, enlarging it is, however, time-consuming and expensive. It is the usual method now used, however, and it is an object of our invention to provide an underreamer 7 which may be carried above the bit 6 so that the operations of drilling and underreaming can be carried on simultaneously.

It is not practical to attempt to use the drill pipe 8 as a guide for the bit, as the walls of the hole are highly abrasive, and the drill pipe is of considerably smaller diameter than the diameter A. The bit, having no guidance, tends to stray off a straight line, and crooked, keystoned, and corkscrewed holes result. It is a further object of our invention to provide a reamer 7 which may be placed above the bit, as shown in Fig. 1, and which is so constructed as to center the drill pipe 8 in the hole I and thus guide the bit 6 in a straight line. None of the reamers now in use in drilling oil wells can be satisfactorily used above the bit, as shown in Fig. 1, since they are not strong enough to perform the reaming operation, drive the bit, and at the same time deliver the drilling mud from the drill pipe 8 to the bit 6, and it is an object of our invention to provide a reamer that has all these advantages.

The strains imposed on the bit 6 and the underreamer 7 are quite heavy. To obtain high drilling speed or to "make hole," the drill pipe 8 may be rotated at a speed of 200 revolutions per minute, and the bit and reamer are pressed against the walls of the well with great force.

Also the walls of the well are highly abrasive, and the drilling mud which carries the cuttings of the bit 6 out of the well is also abrasive. Small parts wear out and are broken off.

A type of underreamer invented by one of the applicants, and therefore called the "Koppl type" reamer, has proved very successful in service. It depends upon certain fundamental principles which can be understood by an inspection of Fig. 2, in which the lines 20—20 and 21—21 intersect at a point 22 at the axis of the well bore. The drill pipe and the body of the reamer should rotate about this axis, and the wall of the well 1 should be reamed concentric with this axis. In a Koppl type reamer, a cylindrical cam 23 is provided which is concentric about an axis 24. This axis is offset on the line 21 from the axis 22 by a distance $a$ so that the cam 23 is eccentric to the center and wall of the hole. Mounted to turn freely on the cam 23 is a toothed cutter 25. The periphery of the cutter, when it is in the position shown in full lines in Fig. 2, is concentric with an axis 26 on the line 21—21 which is offset from the axis 24 by a distance $b$. In practice the distances $a$ and $b$ are made substantially of the same magnitude. If the cutter 25 is turned on the cam 23 through an angle of 180° into a position 27 shown in dotted lines in Fig. 2, the two eccentricities $a$ and $b$ cancel each other, and the periphery of the cutter 25, as indicated by the dotted circle 27, is concentric with the axis 22 and therefore concentric with the center of the hole 1 and the wall of the hole 1. The cutter 25 is said to be in its "expanded" position when it is in the position shown in full lines in Fig. 2 and in its "contracted" position when it is in the position shown in dotted lines 27. Reamers utilizing this principle of double eccentricity are hereinafter called "Koppl type" reamers.

To cut satisfactorily, the cutter 25 must be held against the wall of the well with considerable pressure. To insure this pressure, the arrangement shown in Fig. 3 is used, in which an upper cutter 25 and a lower cutter 30 are used. The cam 23 of the upper cutter is preferably made integral with a spindle 31, and a cam 32 for the lower cutter is also integral with the spindle 31. The spindle 31 is provided with a central hole 33 through which the drilling mud 14 passes downwardly in the direction 34 to the bit 6. The axis 22—22 is preferably the center of the well bore as well as the center of the spindle 31 and hole 33. The spindle is rotated by the drill pipe 8 in the center of the hole, and the reamer enlarges the hole 1 from the diameter A to the diameter B. The cam 32 is offset so that its axis 36 is offset from the axis 22—22 and the axis 35—35 of the periphery of the cutter is also offset. It will be noted that the axis 36—36 is offset to the left of the axis 22—22 in Fig. 3 and the axis 24—24 is offset to the right of the axis 22—22. The proper positions of the axes 24—24, 26—26, 35—35, and 36—36 are indicated in Fig. 2 for a two cutter reamer. If three or more cutters are used, the position of their axes is such that the thrust of the various cutters balances each other, and reamers having three or more cutters may be used.

If two cutters 25 and 30 which are loose on their cams and not otherwise restrained are used, the position of the cutter 35 with relation to the cutter 30 is entirely fortuitous. In Fig. 3 both cutters are shown in their expanded position, and it is an object of our invention to provide means, not yet described, for insuring that the two cutters shall expand and contract in unison. Assuming that they do so expand and contract, the pressure of the wall of the well 1 is against the cutter 30 in the direction 36a and is against the cutter 25 in the direction 37. These forces are in opposite directions 36a and 37 and tend to balance each other so that very heavy pressures may be used to force the teeth of the cutters into the wall of the well 1. The cuttters are preferably conical and so proportioned that the lower cutter 30 reams the well from the diameter A to an intermediate diameter C and the upper cutter 25 reams the well from the diameter C to the diameter B. Each cutter 25 and 30 should have an outside diameter slightly smaller than the inside diameter of the casing 4 through which the reamer must pass, and when the cutters are rotated 180° around their axes from their expanded positions, as shown in full lines in Fig. 3, to the position shown in dotted lines at 27 and 38 or to their retracted position, the periphery of the cutters is concentric with the axis 22—22, and the reamer will readily pass through the casing 4. The cutters 25 and 30 must be provided with cutting teeth. These teeth are preferably wedge-shaped ridges extending parallel to the axis 22—22. They may, however, extend helically or circumferentially around the periphery of one or more cutters. These teeth do not cut by abrasion, as the cutters do not rotate with the spindle 31. The teeth are forced into the wall of the well and rolled on this wall. Such cutter action is old in the art, being used on rock bits and other reamers.

Reamers of this type made with two or more cutters having entirely independent action will ream a hole to full diameter, although, due to lack of synchronism of the cutters, the cutter 25 may be in the expanded position shown in full lines in Fig. 3 when the cutter 30 is in its retracted position 38. When this occurs, the reamer axis 22—22 is simply pushed away from the center of the hole or downwardly as viewed in Fig. 3, and very little cutting is done. From time to time the cutters will both be in or near their expanded positions at the same instant or in the position shown in Fig. 3, and the reamer will cut to full gauge. Some cutting will occur at all times due to the inertia of the tools, and once in perhaps five or six revolutions the cutters will be close enough to their expanded positions at the same instant to produce substantial cutting. Such reamers are, however, "slow diggers," and we prefer to gear the cutters together so that they expand and contract in unison, thus holding the axis 22—22 of the reamer close to the center of the hole at all times. The reamer 7 then acts as a centering device for the bit 6, insuring a straight hole, and since each revolution produces a full cutting expansion, the reamer is a fast digger. In practice, such reamers will ream a hole much faster when used alone than the usual type of bit 6 will "make hole," with the result that when the reamer 7 is used with the bit 6, the reamer is not called upon to work to its full capacity and therefore makes a very smooth, straight, cylindrical hole.

It is therefore desirable to gear the cutters to each other, and we have devised various means for so doing. The problem is to gear to each other two or more eccentrics moving about different centers. Since the drilling is a rough operation, the relative movement need not be exact, and for reasons that will appear hereinafter it is more important that the cutters be aligned in their retracted position than it is that they be aligned in their expanded position. Moreover, the cutters operate in mud, and a closely fitting gearing would clog up. One method of gearing the cutters together, as shown in Figs. 4 and 5, may be used, Fig. 4 showing the cutters in their expanded position and Fig. 5 showing them in their retracted position. The upper cutter 25 is provided with a parallel jawed slot 40 in its lower end, and a projection 41 is provided on the upper end of the lower cutter 30, this projection 41 sliding in the slot 40. The cutters are perfectly aligned in both expanded and retracted positions. In passing from the retracted position shown in Fig. 5 to the position shown in Fig. 6, the cutter 25 turns 90° on cam 23, but the cutter 30 needs to turn more than 90°, as shown by the line 42. In passing from the intermediate position shown in Fig. 6 to the fully expanded position shown in Fig. 4, the cutter 25 turns 90°, and the cutter 30 turns a little less than 90°. As a result, the teeth of the cutters 25 and 30, as they enter the formation, are forced circumferentially in the formation, which assists in the cutting but puts some strain on the projection 41 and tends to cause wear on the cutters. This can be partially obviated by making the slot 40 somewhat wider than the projection 41.

A variation in the form of gearing used to connect the cutters together is shown in Figs. 7, 8, 9, and 10. The cutters and cams of these figures are similar to those shown in Fig. 3. In this construction, however, a bearing 43 is formed on the spindle 31 between the cams 23 and 32. This bearing 43 is concentric with the axis 22—22. Turning freely on the bearing 43 is a ring 44 whose outer surface is concentric with the axis 22. Formed on the ring 44 is a pin 45 which projects into a parallel walled slot 46 in the bottom of the top cutter 25, and formed on the bottom of the ring 44 is a pin 47 which projects into a parallel walled slot 48 in the top of the cutter 30. The ring 44 turns freely with the cutters 25 and 30. The cutters are always aligned in both their expended and retracted positions, but in their intermediate positions they are slightly out of alignment, which has no material effect on their ability to "make hole." Figs. 7, 8, 9, and 10 show the cutters in their expanded position. In Figs. 4 to 10, teeth are not shown on the periphery of the cutters, such teeth being of course provided in actual practice.

The art of making rolling toothed cutters has been well developed in the rock bit art, in which such cutters have been used for many years. In Koppl type reamers such as those disclosed herein, only a part of the periphery of the cutter actually cuts, as shown in Fig. 11, and only a part of the periphery needs to be provided with teeth as shown in that figure, in which a cutter 25 turns on a cam 23, the center of the hole being defined by the intersection of the axes 22—22 and 22a—22a. The cutter 25 is shown in the act of enlarging the hole from 1 to 1a.

The cutter 25 is shown in Fig. 11 in its expanded position. When the cutter is in its retracted position, the points of the teeth 50 lie in the circle 51 concentric with the axis of the well with a clearance 52 from the wall of the well. As the cutter is forced into contact with the wall 1 of the well, only the teeth to the right of the axis 22—22 can be brought into actual contact with this wall 1. The teeth 50 are therefore provided on a little more than half the cutter, and it is desirable to have them of gradually diminishing pitch and depth on either side of the axis 22a—22a. In practice, the pitch 53 of the teeth 50 near the axis 22a—22a may be about twice the pitch 54 of the teeth near the axis 22—22. By varying the pitch, the tendency of the teeth to produce a corrugated surface on the inner wall 1 of the well is reduced. Teeth like those shown at 50 in Fig. 11 are the preferred form, these teeth extending from the top to the bottom of the cutter. Circumferential teeth like those shown in Figs. 12 and 12a may be used. The teeth 55 cut better than the teeth 50 in some sorts of rock formation, as they tend to slice into the formation. They may also be tapered, having their greatest depth at the axis 22a—22a and tapering to no depth at the axis 22—22. Following rock bit practice, the teeth on the cutters may be herringbone or other irregular shapes.

A bit involving the principles of design above described is disclosed in Figs. 13 to 22, inclusive. This bit uses a somewhat different means for gearing the cutters together than that previously described. This bit uses a spindle 101 which has tapered threads 102 on its upper end and tapered threads 103 on its lower end. These threads are concentric with the axis 104—104 of the bit, which is also the axis of the hole. A circulation hole 105 extends through the spindle 101, and mud-laden fluid or drilling mud is forced downwardly through the hole 105 in the direction 106. Formed on the spindle 101 is a lower cam 107, and mounted on the cam 107 is a sleeve 108. A lower toothed cutter 109 rotates on the sleeve 108. The cam 107 is eccentric to the axis 104—104, and the cutter 109 is eccentric to the cam, these eccentricities being approximately equal, so that when the cutter 109 is turned 180° about the axis 104—104 from the position shown in Fig. 13a, the periphery of the cutter is concentric with the axis 104—104. A collar 110 is threaded onto the threads 103 of the spindle 101, the lower end of this collar (not shown) carrying the bit 6. Formed on the upper end of the cutter 109 is a projection 111 having the general shape shown in Fig. 15.

Formed on the spindle 101 is an upper cam 112. Between the cams 112 and 107 is a zone 113, a portion 113a of which is concentric with the lower cam 107 and a portion 113b of which is concentric with the upper cam 112. Mounted on the upper cam 112 is a sleeve 114, and mounted on the sleeve 114 is an upper cutter 115. The upper cam and cutter also follow the same rule as to eccentricity as the lower cam and cutter. Formed on the lower end of the upper cutter 115 is a projection 116 having the shape shown in Fig. 15. The projections 111 and 116, as shown in Figs. 13a and 15, project into the space adjacent the zone 113 of the reamer. With the cutters in their expanded position, as shown in Fig. 13a, the projections 111 and 116 occupy their expanded position, as shown in Fig. 15, and when the cutters are contracted into a retracted position concentric with the axis 104—104, the projections 111 and 116 occupy the positions shown in Fig. 15a. The purpose of the projections 111 and 116 is to prevent the two cutters from getting too much out of alignment. To practically produce hole, the cutters need not be exactly aligned at any time, and this method of locking the cutters together is quite satisfactory. It should be noted, however, that it is merely another method of gearing the cutters together in addition to those already described and shown in Figs. 4 and 7.

In any reamer of the Koppl type, it is highly desirable to positively lock the cutters in their retracted position, as shown in Fig. 15a. By locking the cutters, no trouble is met in running the reamer up or down in the casing 4 or turning it inside the casing, as the cutters are both securely locked in their retracted position. Also, it is easy to withdraw the reamer from the bottom of the hole at any time. If the cutters are geared together, as previously described, if one cutter is retracted, the other cutter must also be retracted. If, therefore, the upper cutter 115 is locked in its retracted position, the lower cutter 109 must also be locked in the retracted position. Regardless of the type of gearing provided between the cutters, the following described means for locking the upper cutter may be used. For the purpose of locking the cutters in their retracted position, a slot 120 is provided in the top of the cutter 115, as shown in Fig. 13 and Fig. 13a. A bolt 121 is so placed that it can be forced into the slot 120 when the cutters are in their retracted position, as shown in Fig. 15a. The bolt 121 slides in a cylindrical hole in a body 122 passing through a cylindrical hole 123 in the flange of the sleeve 114. The flange is pinned, as shown at 124, to the body 122, and the body 122 is keyed, as shown at 125, to the spindle 101. Fitting loosely in a bore in the body 122 is a cylinder member 130 having a mud cavity 131 and a piston cavity 132 formed therein. The cavities 131 and 132 are in open communication with each other through a small opening 133 surrounding the spindle 101. A small hole 134 is drilled through the spindle and admits drilling mud to the mud cavity 131 from the circulation hole 105. Chevron packing 135, preferably of soft rubber, is provided between the cylinder member 130 and the spindle 101. Sliding in the piston cavity 132 of the cylinder member 130 is a piston 140. Chevron packings 141 and 142 are provided between the piston 140 and the cylinder member 130 and the spindle 101. The bolt 121 is cut away, as shown at 143, and has a head 144 which projects into an opening 145 in the piston 140. The piston 140 has three slots 150 formed therein, and the head 151 of a bolt 152 is placed in each slot. Surrounding each bolt is a compression spring 153. The body 122 abuts against a collar 154 which is keyed as shown at 155 to the spindle 101. A drill collar 156 is secured to the threaded end 102 of the spindle 101. Three holes 157 are drilled through the collar 154 so that each of the springs 153 abuts against the drill collar 156. A small hole 158 is drilled through the body 122.

The method of operation of the locking device is as follows. The springs 153 tend to push the piston 140 down, as shown in Fig. 13, thus pushing the bolt 121 into the slot 120. The mud space 131 is in open communication with the central circulation hole 105, and the piston space 132 is in open communication with the mud space 131. Fluid at the same pressure as that in the circulation hole 105 is therefore present in the piston space, and this pressure acts to force the piston 140 upwardly to overcome the downward force exerted by the compression springs 153, as shown in Fig. 13. The lower end of the piston 140 is subject to the pressure of this fluid. Fluid from the well bore outside the reamer acts on the upper end of the piston 140. As long as these pressures are equal, there is no unbalanced pressure on the piston, and the springs 153 force the piston 140 and the bolt 121 down, thus locking the upper cutter 115. Before putting the reamer in the well, the reamer is assembled with the cutters 109 and 115 in their retracted position and with the bolt 121 firmly seated in the slot 120 of the upper cutter 115. The springs 153 hold the bolt 121 in place, and the bolt 121 holds the cutters in their retracted position until it is desired to drill and ream. Drilling mud is then circulated through the circulation hole 105 in the direction 106.

The holes in the bit 6 are somewhat constricted, and there is some drop in pressure on the mud as it passes through the bit. If this drop in pressure is not enough, a bushing 160 having a small hole 161 therein may be placed in the path of the mud. As a result of the drop in pressure in the drilling fluid after it leaves the circulation hole 105 in the spindle 101, the pressure of the mud in the hole 105 at the hole 134 is higher than the pressure of the mud in the well outside the reamer at the hole 158. This differential in pressure forces the piston 140 upwardly and pulls the bolt 121 out of the slot 120 in the cutter 115, and the cutters 109 and 115 are free to rotate. If the drill pipe is rotated slowly and the circulation of mud is gradually shut off, the bolt 121 is forced back into the slot 120, and the cutter 115 is locked.

In practice, the reamer is used as follows. It is assembled with the cutters locked by the bolt 121 and with the bit 6 in place below the reamer 7. The bit is then lowered to the bottom of the hole, and the mud pump 13 is started up, thus establishing mud circulation through the hole 105. This circulation releases the bolt 121, and the cutters 109 and 115 are free to turn on their cams. Since the cutters are in their retracted position and rotating with their cams, they will not immediately start cutting. However, the cutters are subjected to centrifugal force, the drag of the mud in the well, and they strike against the wall of the well as the drill pipe jumps around in the hole. As a result, the cutters are slowed down a little with relation to the spindle 101 and immediately move to expanded or cutting position. In this position the spindle 101 and its cams rotate inside the cutters, which move from the contracted position shown in Fig. 15a to the expanded position shown in Fig. 15, and back into the position shown in Fig. 15a at each revolution of the spindle. In the actual operation of Koppl reamers of various types we have never had any trouble in getting the reamer to start operations, nor have they ever stopped reaming as long as there was hole to ream. Whenever it is desired to remove the reamer from the well, the rotation of the drill pipe is reduced, and the pump is shut down. Mud circulation then stops, and the reamer then locks and may be withdrawn with the cutters in their retracted position.

The cutters and their sleeves wear out in service and must be replaced. At the same time the reamer is disassembled, mud cleaned out of the mud cavity 131 and piston cavity 132, and the cavities 131 and 132 filled with grease.

The cutters cut only a small part of the wall of the hole at each revolution of the drill pipe, as illustrated in Fig. 11, and the teeth 50 of that figure are driven into the wall of the well bore with considerable force, and, although the cutters roll slightly on the wall of the well while cutting, the cutters have considerable impact force. Due to this tendency of the cutters to roll on the wall of the well bore and the frictional drag of the cams, each blow of the cutter is upon a new surface of the wall. Due to the fact that each cutter delivers a cutting blow at each revolution of the spindle 101, the number of separate blows may be as high as 200 per minute. At each blow the cutter chips off a portion of the wall of the well bore, and since the axis 104—104 of the spindle is central of the well bore, a very smooth, straight, reamed hole is produced.

The reamer previously described is well adapted to be used above a bit 6. It has a large, straight circulation hole to conduct drilling mud down to the bit. Its spindle is of simple form and is sufficiently strong to drive any bit. It automatically locks when the circulation of mud is shut off, and when so locked it presents a concentric outer surface that does not interfere with the withdrawal of the bit. If properly designed, it centers the drill pipe in the well bore and tends to guide the bit in a straight line. During drilling, the well above the reamer tends to mud up below the shoe 5; that is, heavy mud collects on the walls of the well, being compacted there by the drill pipe. If it is desired to clean out this mud, circulation is maintained whenever the drill pipe is being pulled upwardly, and the reamer operates to dislodge this mud and provide a clean hole. As soon as the reamer has been pulled up to the shoe 5, circulation is shut off, and the reamer locks in contracted position.

One of the principal advantages of this reamer is that it can be used with a bit and thus ream the hole as the hole is drilled. Another advantage is that the bit can continue drilling after it beomes so worn that it no longer drills a full sized hole, the reamer enlarging the hole to a considerably larger size than that originally drilled by the bit, even after the bit is badly worn. The operator continues to drill as long as the hole is going down at an economical rate without worrying about whether the bit is cutting a hole of "full gauge" or the desired diameter.

We claim as our invention:

1. In an underreamer, the combination of: a spindle having two or more cams formed thereon, said cams being eccentric to the axis of the underreamer; a cutter for each of said cams, each cutter having a bore fitting over its cam and a cutting periphery which is not concentric to said bore, so that as said cutters rotate on said cams each of them passes through an expanded and a retracted position; means for so connecting the cutters to each other that they are all in substantially their retracted position when any of said cutters is in its retracted position; and a locking means movable to and from a locking position, said locking means locking one of said cutters when said locking means is in the locking position so that said cutter cannot rotate in the underreamer, said cutter being free to so rotate whenever said locking means is moved out of its locking position.

2. In an underreamer, the combination of: two or more cutters, so mounted that they can turn about a center outside the central axis of the under-reamer through expanded and retracted positions; means for so connecting said cutters that they are all in their retracted position at the same time; and a locking means movable to and from a locking position, said locking means locking one of said cutters when said locking means is in the locking position so that said cutter cannot rotate in the underreamer, said cutter being free to so rotate whenever said locking means is moved out of its locking position.

3. In an underreamer, the combination of: two or more cutters, so mounted that they can turn about a center outside the central axis of the under-reamer through expanded and retracted positions; means for so connecting the cutters to each other that they are all in substantially their retracted position when any of said cutters is in its retracted position; and a bolt movable to and from a locking position, said bolt in its locking position engaging and locking one of said cutters so that it cannot rotate in the underreamer, the cutter being free to so rotate whenever said bolt is moved out of its locking position.

4. In an underreamer, the combination of: a spindle having two or more cams formed thereon, said cams being eccentric to the axis of the spindle; a cutter for each of said cams, each cutter having a bore fitting over its cam and a cutting periphery which is not concentric to said bore, so that as said cutters rotate on said cams each of them passes through an expanded and a retracted position; means for so connecting the cutters to each other that they are all in substantially their retracted position when any of said cutters is in its retracted position; and a bolt movable to and from a locking position, said bolt in its locking position engaging and locking one of said cutters so that it cannot rotate in the underreamer, the cutter being free to so rotate whenever said bolt is moved out of its locking position.

5. In an underreamer, the combination of: two or more cutters, so mounted that they can turn about a center outside the central axis of the under-reamer through expanded and retracted positions; means for so connecting the cutters to each other that they are all in substantially their retracted position when any of said cutters is in its retracted position; a bolt movable to and from a locking position, said bolt in its locking position engaging and locking one of said cutters so that it cannot rotate in the underreamer, the cutter being free to so rotate whenever said bolt is moved out of its locking position; and means by which an operator may actuate said bolt.

6. In an underreamer, the combination of: a spindle having two or more cams formed thereon, said cams being eccentric to the axis of the underreamer; a cutter for each of said cams, each cutter having a bore fitting over its cam and a cutting periphery which is substantially eccentric to said bore, so that as said cutters rotate on said cams each of them passes through an expanded and a retracted position; means for so connecting the cutters to each other that they are all in substantially their retracted position when any of said cutters is in its retracted position; a bolt movable to and from a locking position, said bolt in its locking position engaging and locking one of said cutters so that it cannot rotate in the underreamer, the cutter being free to so rotate whenever said bolt is moved out of its locking position; and means by which an operator may actuate said bolt.

7. In an underreamer, the combination of: two or more cutters, so mounted that they can turn eccentrically through expanded and retracted positions; means for so connecting the cutters to each other that they are all in substantially their retracted position when any of said cutters is in its retracted position; a bolt movable to and from a locking position, said bolt in its locking position engaging and locking one of said cutters so that it cannot rotate in the underreamer, the cutter being free to so rotate whenever said bolt is moved out of its locking position; a piston operated by the pressure of the drilling mud; and means by which said piston operates said bolt.

8. In an underreamer, the combination of: a spindle having two or more cams formed thereon, said cams being eccentric to the axis of the underreamer; a cutter for each of said cams, each cutter having a bore fitting over its cam and a cutting periphery which is substantially eccentric to said bore, so that as said cutters rotate on said cams each of them passes through an expanded and a retracted position; means for so connecting the cutters to each other that they are all in substantially their retracted position when any of said cutters is in its retracted position; a bolt movable to and from a locking position, said bolt in its locking position engaging and locking one of said cutters so that it cannot rotate in the underreamer, the cutter being free to so rotate whenever said bolt is moved out of its locking position; a piston operated by the pressure of the drilling mud; and means by which said piston operates said bolt.

9. A locking means for a cutter of an underreamer or similar tool, comprising: a bolt adapted to engage and lock said cutter; spring means for forcing said bolt into its engaging position; and a piston actuating said bolt against the action of said spring means to force said bolt out of its engaging position.

10. A locking means for a cutter of an underreamer or similar tool, comprising: a bolt adapted to engage and lock said cutter; spring means for forcing said bolt into its engaging position; and a piston actuating said bolt against the action of said spring means to force said bolt out of its engaging position, conduits being provided to conduct drilling mud to said piston in such a manner that said piston forces said bolt out of its engaging position whenever the pressure of the drilling mud inside said underreamer exceeds the pressure of the drilling mud outside said underreamer by a definite amount.

11. In an underreamer, the combination of: a spindle having two or more cams thereon, said cams being eccentric to the axis of said underreamer; a cutter for each of said cams, each cutter having a bore fitting over its cam and a cutting periphery substantially eccentric to said bore, so that as said cutters rotate on said cams each of them passes through an expanded and a retracted position; and means for so connecting said cutters that they pass through said retracted position at substantially the same time.

12. In an underreamer, the combination of: a body structure; two eccentric cams forming a part of said body structure, the outer surface of said cams being concentric about a center offset from the center of said underreamer; two cutters each having a bore fitting on one of said cams and having an outer cutting surface a portion of which is not concentric with the center of said bore; means for so connecting said cutters that both are in their retracted position at the same time; means for locking said cutters so that they cannot turn on said cams; and means for releasing said locking means so that said cutters can turn on said cams.

13. In an underreamer, the combination of: a body structure; two eccentric cams forming a part of said body structure, the outer surface of said cams being concentric about a center offset from the center of said underreamer, the center of one cam being offset from the center of the other cam; two cutters each having a bore fitting on one of said cams and having an outer cutting surface a portion of which is not concentric with the center of said bore; means for so connecting said cutters that both are in their retracted position at the same time; means for locking said cutters so that they cannot turn on said cams; and means for releasing said locking means so that said cutters can turn on said cams.

14. In an underreamer, the combination of: a body structure; two eccentric cams forming a part of said body structure, the outer surface of said cams being concentric about a center offset from the center of said underreamer; two cutters each having a bore fitting on one of said cams and having an outer cutting surface a portion of which is not concentric with the center of said bore; means for locking said cutters so that they cannot turn on said cams; and means for releasing said locking means so that said cutters can turn on said cams.

15. In an underreamer, the combination of: a body structure; two eccentric cams forming a part of said body structure, the outer surface of said cams being concentric about a center offset from the center of said underreamer, the center of one cam being offset from the center of the other cam; two cutters each having a bore fitting on one of said cams and having an outer cutting surface a portion of which is not concentric with the center of said bore; means for locking said cutters so that they cannot turn on said cams; and means for releasing said locking means so that said cutters can turn on said cams.

16. In an underreamer having a spindle with two or more cams formed thereon, one of said cams being eccentric to the axis of the other cam, a cutter for each of said cams, each cutter having a bore fitting over its cam and a cutting periphery part of the cutting portion of which is eccentric to said bore, so that as said cutters rotate on said cams each of them passes through an expanded and a retracted position with reference to the axis of the spindle, the combination of: means for so connecting said cutters that they pass through said retracted position at substantially the same time.

17. In an underreamer having a spindle with two or more cams formed thereon, one of said cams being eccentric to the axis of the other cam, a cutter for each of said cams, each cutter having a bore fitting over its cam and a cutting periphery part of the cutting portion of which is eccentric to said bore, so that as said cutters rotate on said cams each of them passes through an expanded and a retracted position with reference to the axis of the spindle, the combination of: means for so connecting the cutters to each other that they are all in substantially their retracted position when any of said cutters is in its retracted position; a bolt movable to and from a locking position, said bolt units locking position engaging and locking one of said cutters so that it cannot rotate in the underreamer, the cutter being free to so rotate whenever said bolt is moved out of its locking position; and means by which an operator may actuate said bolt.

18. In an underreamer having a spindle with two or more cams formed thereon, one of said cams being eccentric to the axis of the other cam, a cutter for each of said cams, each cutter having a bore fitting over its cam and a cutting periphery part of the cutting portion of which is eccentric to said bore, so that as said cutters rotate on said cams each of them passes through an expanded and a retracted position with reference to the axis of the spindle, the combination of: means for so connecting the cutters to each other that they are all in substantially their retracted position when any of said cutters is in its retracted position; a bolt movable to and from a locking position, said bolt in its locking position engaging and locking one of said cutters so that it cannot rotate in the underreamer, the cutter being free to so rotate whenever said bolt is moved out of its locking position; a piston operated by the pressure of the drilling mud; and means by which said piston operates said bolt.

ERNEST KOPPL.
FORD W. HARRIS.